United States Patent [19]

Nix

[11] Patent Number: 4,692,700

[45] Date of Patent: Sep. 8, 1987

[54] ROLLING MAGNETIC PROBE FOR CONTINUOUS THICKNESS MEASUREMENT

[75] Inventor: Hans F. Nix, Cologne, Fed. Rep. of Germany

[73] Assignee: Elektro-Physik Hans Nix & Dr.-Ing. E. Steingroever KG, Cologne, Fed. Rep. of Germany

[21] Appl. No.: 692,719

[22] Filed: Jan. 18, 1985

[30] Foreign Application Priority Data

Jan. 18, 1984 [DE] Fed. Rep. of Germany ....... 3401466

[51] Int. Cl.⁴ .................... G01B 7/10; G01R 33/12
[52] U.S. Cl. .................................................. 324/229
[58] Field of Search .............................. 324/229–231, 324/228

[56] References Cited

U.S. PATENT DOCUMENTS 3,002,149  9/1961  Christian ........................... 324/228
3,249,860  5/1966  Huggins ............................ 324/231
3,866,115  2/1975  Lewis ............................... 324/231

Primary Examiner—Ernest F. Karlsen
Assistant Examiner—Walter E. Snow
Attorney, Agent, or Firm—Harold Gell

[57] ABSTRACT

A probe for the continuous measurement of the thickness of strips of electrically conducting, magnetic or nonmagnetic strips of material, comprises a the measuring pole (7) arranged in a roller (4) with a narrow running surface. The roller (4) has a ring-shaped crowned middle part (9) in alignment with the measuring pole (7) and is pivoted on a fixed axis of rotation (10) on both sides of the measuring pole (7). The axis of rotation (10) forms part of a housing (12) which screens the measuring pole (7) against external magnetic fields. The roller (4) can consist of a suitable nonmagnetic material, such as nonmagnetic steel, bronze, titanium, ceramic, etc., and the probe can operate according to the magnetic inductive process, according to the eddy current process or according to a combination of these two processes.

22 Claims, 2 Drawing Figures

ROLLING MAGNETIC PROBE FOR CONTINUOUS THICKNESS MEASUREMENT

BACKGROUND OF THE INVENTION

The present invention pertains to a probe for the continuous measurement of the thickness of layers or strips.

In one form of prior-art measuring arrangement two rollers are arranged to the left and right or in front of and behind a sensor.

In another prior-art measuring arrangement two probes are arranged next to or behind only one roller.

In addition, there is also a magnetic inductive two-roller arrangement in which the two rollers are made of magnetic inductive material to provide the magnetic poles.

All of these measuring arrangements share the disadvantage that only area thickness measurement is possible rather than socalled single-point measurement, which is the only measurement to determine the exact thickness of the web material being measured.

Other devices for the measurement of moving strips, or layers, are disclosed in U.S. Pat. Nos. 1,925,904 and No. 2,703,384.

BRIEF DESCRIPTION OF THE INVENTION

The present invention has the basic object of creating a probe with high resolution power, e.g., over the width of a metal foil web, which is designed in such a way that the support point of the measuring probe is also the measuring point.

The fact that the measuring pole of the probe is arranged inside a roller having a narrow running contact surface guarantees that the foil, web or plate materials to be measured will be touched only in an exactly defined point in a rolling contact. The measuring pole can be directed perpendicularly toward the web material in such a way that the support point of the roller is the same as the measuring point, whereby a single-point measuring probe with especially high resolution power, namely, over the width of a foil web, is created ina surprisingly simple manenr.

If the roller has an arched middle part ina crowned form generally in the zone of the measuring pole, traversing or crosswise movement of the roller on the web material is possible without damaging the material to be measured.

The probe according to the present invention with a roller having a narrow running surface also permits an exact distance measurement at the contact point of the roller probe with the web material being measured in a simple manner. Both the magnetic inductive probe and the eddy-current probe are screened practically completely against external magnetic fields by a pot system despite the presence of the roller body.

The probe is also protected due to its special design especially against dust and water and outside mechanical effects. Cooling with air or water is also possible in a simple manner by letting the cooling medium flow in and out through the fixed axis of the roller.

Nonmagnetic materials, such as nonmagnetic steel, bronze, titanium, ceramic or another material which does not substantially influence the measurement, should be considered as materials for the roller.

Titanium has the advantage that it is nonmagnetic and is a poor electrical conductor. It is able to withstand high mechanical stresses and has low specific gravity, which in turn leads to a low moment of inertia. This can be especially important, for example, when the probe must be placed on a running, highly delicate material. Such a probe is especially suitable for the magnetic inductive process.

In contrast, a probe with a roller consisting of ceramic material is suitable for the eddy-current and for the magnetic inductive processes.

Especially strict requirements concerning roundness and vertical movement are not imposed on the reference surface of the roller. An analog instrument displays the thickness of the material web being measured directly in millimeters, and a differential instrument with adjustable limit marks indicates the deviation from the nominal value.

To determine sagging or oblique position of a web, it is recommended to arrange several measuring points over the width of the web material to be measured.

The contact force of the roller can be set continuously between zero and a maximal force according to the principle of the tone arm of a record player.

The measuring device can also be mounted in any position. Since the principle adopted measures the distance of the roller from the ferro-magnetic supporting surface (steel roller, or a steel plate), the measured value cannot be falsified by such influences such as changes in density, changes in moisture, changes in the material compositio, changes in color, etc.

BRIEF DESCRIPTION OF THE DRAWING

A preferred embodiment of the present invention is shown in in the drawings in which.

DETAILED DESCRIPTION OF THE INVENTION

The probe according to the present invention serves for the measurement of the thickness of strips or plates of electrically conducting, magnetic or nonmagnetic material, or of layers with material properties which differ from those of the carrier material, on such strips, and has a fixed measuring pole to which belongs a reference surface made of suitable material on the opposite side of the material to be measured.

Figure 1:
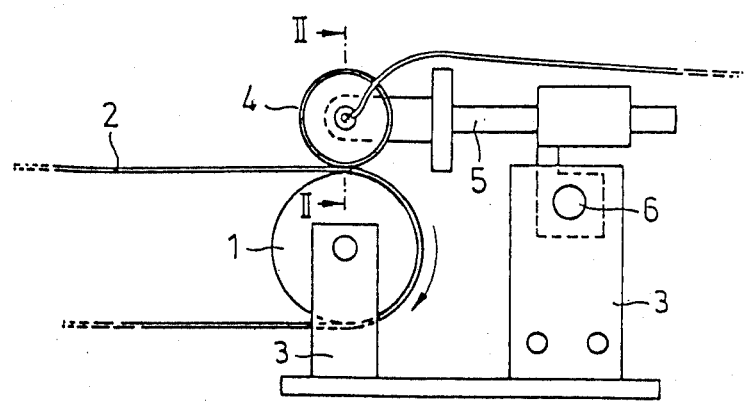
FIG. 1 shows a measuring arrangement with a measuring probe for the continuous measurement of web material.

As is shown in FIG. 1, the measuring arrangement consists of a transport roller 1, for a web material 2, which is pivoted on a support frame 3. Over the transport roller 1, which is designed as a steel cylinder, is mounted a roller 4 on an arm 5 which is pivotally supported an axis 6 on the support frame 3, similar to the tone arm system common in record players. Also, under certain conditions, the transport roller 1 can be replaced by a smooth-surfaced fixed ferromagnetic plate.

Figure 2:
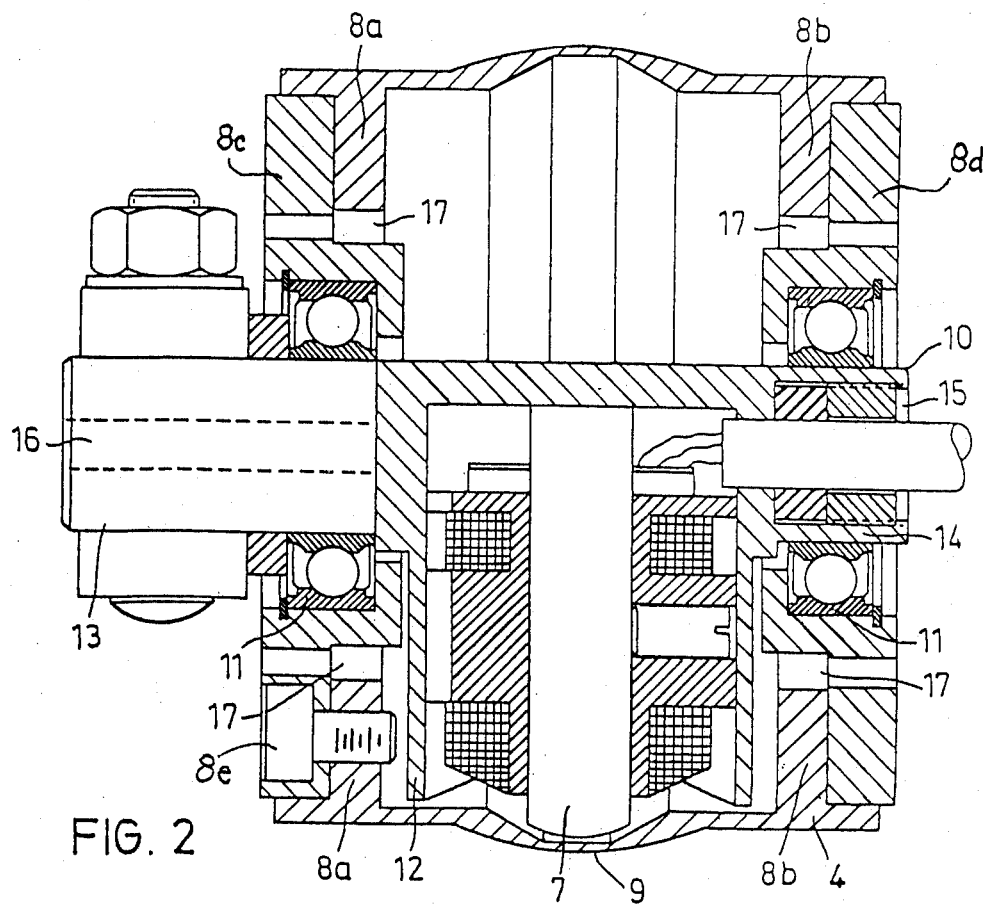
FIG. 2 shows a vertical section through the roller of the measuring probe according to the line II—II in FIG. 1.

As is shown specifically in FIG. 2, the measuring pole 7 is mounted in a roller 4 with a narrow running surface, which has a ring-shaped crowned middle part 9 generally int he zone of the fixed measuring pole 7. The internal periphery of the roller is provided with a pair of flanges 8a and 8b, to which are secured a pair of end plates 8c and 8d, by means such as cap bolts 8e. The roller 4 is pivoted on a fixed axis of rotation 10 on both sides of the measuring pole 7 in ball bearings 11, and the axis of rotation 10 is part of the housing 12 holding the measuring pole 7, which also serves to screen the measuring pole against external magnetic fields according to the magnetic pot principle.

Two coaxial axle journals 13, and 14 project laterally from the housing 12, which form the axis of rotation 10 and one of which has a sealed cable duct 15 and the other passage 16 for cooling air to the measuring pole 7.

The roller end plates also have lateral openings or canals 17 for the passage of cooling air through the two flange portions 8a, and 8b, the cooling air inlet 16 being located in the fixed axis of rotation 10 of the roller 4, while the air is let out through the lateral openings 17 on the two flanges 8a and 8b.

The electromagnetic measurement with the roller probe can be carried out either according to the magnetic inductive process or according to the eddy-current process or possibly also according to a combination of these two processes. The roller 4 is expediently designed as a nonmagnetic steel roller, but it can also consist of bronze, titaniu, ceramic or another material which does not substantially influence the magnetic field measurement.

I claim:

1. Probe means for the continuous measurement of the thickness of a moving strip of material, or of a layer deposited on said moving strip, comprising:
    measurin gpole means;
    external housing means for said measuring pole means, said external housing means configured as a hollow roller means including a ring-shaped crowned middle part forming a narrow running surface pivotally mounted for rotation about said measuring pole means and for rolling contact with one side of the strip to be measured;
    ferromagnetic supporting surface means for contact with the other side of said strip; and
    said measuring pole means mounted within said hollow roller means whereby said measuring pole means is within said crowned middle part and continuously spaced from said one side of the strip by said roller means.

2. The invention defined in claim 1 wherein said pole means includes ferromagnetic housing means within said roller means for shielding the pole means from external magnetic fields.

3. The invention defined in claim 1, wherein said roller means is rotatably mounted on a shaft by a pair of axially spaced bearing means, said pole means being positioned between said bearing means.

4. The invention defined in claim 3 wherein said shaft includes means for introducing electrical wiring for the pole means into the interior of the roller means.

5. The invention defined in claim 4, wherein said shaft includes passage means for introducing cooling air into the interior of the roller means.

6. The invention defined in either one of claims 1 or 2, wherein said roller means is rotatably mounted on a shaft by a pair of axially spaced bearing means, said pole means being positioned between said bearing means.

7. The invention defined in either one of claims 2 or 3, wherein the peripheral surface of said radially outwardly projected crowned portion is in axial alignment with said measuring pole means.

8. The invention defined in either one of claims 1 or 3, wherein said pole means includes ferromagnetic housing means within said roller means for shielding the pole means from external magnetic fields.

9. Probe means for the continuous measurement of the thickness of a moving strip or layer of material, comprising:
    shaft means disposed parallel to said strip or layer, mounted for movement toward and away from one side of said strip or layer;
    roller means including a ring-shaped crowned middle part forming a narrow running surface having axially spaced end plates rotatably mounted on said shaft means, and; measuring pole means fixedly mounted on said shaft means within said roller means and positioned so the face of said measuring pole is within said ring-shaped crowned middle part.

10. The invention defined in claim 9, wherein said shaft means also includes a housing surrounding said pole means and having an open end adjacent the inner periphery of the roller means for shielding the pole means from external magnetic fields.

11. The invention defined in claim 9 wherein said shaft means includes passage means in communication with the interior of the roller means.

12. The invention defined in claim 11, wherein cooling medium is introduced through said passage means, and one of said end plates is provided with an opening for the egress of said cooling medium.

13. The invention defined in claim 9, wherein said shaft means includes passage means for the introduction of electrical wiring for said measuring pole means.

14. The invention defined in claim 9, wherein said roller means comprises a generally cylindrical element for rolling contact with a strip, or layer, to be measured, said end plates being detachably secured to said cylindrical element.

15. The invention defined in claim 14, wherein said end plates include bearing support means.

16. The invention defined in claim 15 wherein said bearing comprises a pair of ball bearings.

17. The invention defined in any one of claims 11, 12, 13, 14, 15 and 16, wherein said shaft means includes shielding means for shielding said measuring pole means from external magnetic fields.

18. The invention defined in any one of claims 10, 14, 15, or 16, wherein said shaft means includes passage means for the introduction of cooling medium and electrical wiring for said measuring pole means.

19. Electromagentic probe means for the measurement of the thickness of a moving strip of material comprising:
    hollow roller means including a crowned middle part forming a protruding running surface ring fabricated of non-magnetic material movably mounted for continuous rolling contact with one side of the material being measured;
    support means fabricated of a ferromagnetic material disposed for contact with the other side of the material being measured and adjacent the point of contact with said roller means;
    a cup-shaped ferromagnetic pot means including a centrally disposed elongated ferromagnetic pole piece provided with energizing coil means mounted within said hollow roller means; and
    one end of the pole piece and the open end of said pot means being disposed closely adjacent said one side of the material being measured to define with said support means a closed generally ellipsoidal magentic circuit extending through the material being measured.

20. The invention defined in claim 19, wherein said support means comprises a roller.

21. The invention defined in claim 19, wherein said hollow roller means includes passage means to permit the circulation of cooling fluid to the interior of the roller means and the introduction of electrical connection to the energizing coil means.

22. The invention defined in any one of claim 19, 20 or 21 wherein said non-magnetic material is selected from a group consisting of non-magentic steel, bronze, titanium or ceramic.

* * * * *